US007678256B2

(12) United States Patent
Davalos et al.

(10) Patent No.: US 7,678,256 B2
(45) Date of Patent: Mar. 16, 2010

(54) INSULATOR-BASED DEP WITH IMPEDANCE MEASUREMENTS FOR ANALYTE DETECTION

(75) Inventors: Rafael V. Davalos, Blacksburg, VA (US); Blake A. Simmons, San Francisco, CA (US); Robert W. Crocker, Fremont, CA (US); Eric B. Cummings, Livermore, CA (US)

(73) Assignee: Sandia Corporation, Livermore, CA (US)

( * ) Notice: Subject to any disclaimer, the term of this patent is extended or adjusted under 35 U.S.C. 154(b) by 652 days.

(21) Appl. No.: 11/556,685

(22) Filed: Nov. 3, 2006

(65) Prior Publication Data

US 2008/0105565 A1 May 8, 2008

(51) Int. Cl.
*G01N 27/447* (2006.01)
*G01N 27/453* (2006.01)

(52) U.S. Cl. ...................................... 204/547; 204/643

(58) Field of Classification Search ................. 204/547, 204/643

See application file for complete search history.

(56) References Cited

U.S. PATENT DOCUMENTS

| | | | | |
|---|---|---|---|---|
| 2003/0178310 | A1* | 9/2003 | Gawad et al. | 204/547 |
| 2004/0026250 | A1 | 2/2004 | Cummings | |
| 2005/0072676 | A1 | 4/2005 | Cummings et al. | |
| 2006/0243594 | A1* | 11/2006 | Schnelle et al. | 204/547 |

OTHER PUBLICATIONS

Junya Suehiro; Ryo Hamada; Daisuke Noutomi; Masanori Shutou, Masanori Hara; "Selective detection of viable bacteria using dielectrophoretic impedance measurement method". Journal of Electrostatics, 2003, vol. 57, pp. 157-168.

Junya Suehiro; Daisuke Noutomi; Masanori Shutou; Masanori Hara; "Selective detection of specific bacteria using dielecrophoretic impedance measurement method combined with an antigen-antibody reaction", Journal of Electrostatics, 2003, vol. 58, pp. 229-246.

Mojca Pavlin; Damijan Miklavcic; "Effective Conductivity of a Suspension of Permeabilized Cells: A Theoretical Analysis", Biophysical Journal, 2003, vol. 85, pp. 719-729.

Blanca H. Lapizco-Encinas; Rafael V. Davalos; Blake A. Simmons; Eric B. Cummings; Yolanda Fintschenko; "An insulator-based (electrodeless) dielectrophoretic concentrator for microbes in water", Journal of Microbiological Methods, 2005, vol. 62, pp. 317-326.

Gregory J. McGraw; Rafael V. Davalos; John D. Brazzle; John Hachman; Marion C. Hunter; Jeff Chames; Gregory J. Fiechtner; Eric B. Cummings; Yolanda Fintschenko; Blake Simmons; "Polymeric Microfluidic Devices for the Monitoring and Separation of Water-Borne Pathogens Utilizing Insulative Dielectrophoresis", SPIE Proceedings, San Jose, CA, 2005, pp. 59-68.

(Continued)

*Primary Examiner*—Alex Noguerola
(74) *Attorney, Agent, or Firm*—Suzannah K. Sundby, Esq.; Smith, Gambrell & Russell, LLP

(57) ABSTRACT

Disclosed herein are microfluidic devices for assaying at least one analyte specie in a sample comprising at least one analyte concentration area in a microchannel having insulating structures on or in at least one wall of the microchannel which provide a nonuniform electric field in the presence of an electric field provided by off-chip electrodes; and a pair of passivated sensing electrodes for impedance detection in a detection area. Also disclosed are assay methods and methods of making.

15 Claims, 10 Drawing Sheets

OTHER PUBLICATIONS

Edwin L. Carstensen; Robert E. Marquis; Sally Z. Child; Gary R. Bender; "Dielectric Properties of Native and Decoated Spores of *Bacillus megaterium*", Journal of Bacteriology, 1979. vol. 140, No. 3, pp. 917-928.

Masao Washizu; Osamu Kurosawa; "Electrostatic Manipulation of DNA in Microfabricated Structures", IEEE Transactions on Industry Applications, 1990, vol. 26, No. 6, pp. 1165-1172.

Gerard H. Markx; Mark S. Talary; Ronald Pethig; "Separation of viable and non-viable yeast using dielectrophoresis", Journal of Biotechnology, 1994, vol. 32, pp. 29-37.

Jun Yang; Ying Huang; Xiao-Bo Wang; Frederick F. Becker; Peter R. C. Gascoyne: "Cell Separation on Microfabricated Electrodes Using Dielectrophoretic/Gravitational Field-Flow Fractionation", Analytical Chemistry, 1999, vol. 71, pp. 911-918.

Bruce K. Gale; A. Bruno Frazier; "Electrical impedance-spectroscopy particle detector for use in microanalysis systems", Proceedings SPIE Conference on Microfluidic Devices and Systems II, Santa Clara, CA, 1999, vol. 3877, pp, 190-201.

E. B. Cummings; A. K. Singh; Proceedings SPIE Conference on Microfluidic Devices and Systems III, Santa Clara, CA, 2000, vol. 4177, pp. 151-160.

J. Suehiro, D. Noutomi; R. Hamada; M. Hara; "Selective Detection of Bacteria Using Dielectrophoretic Impedance Measurement Method Combined with Antigen-Antibody Reaction", Industry Applications Conference, 2001, Thirty-Sixth IAS Annual Conference Record of the 2001 IEEE. vol. 3, pp. 1950-1955.

Junya Suehiro; Masanori Shutou; Tetsuji Hatano: Masanori Hara; "High sensitive detection of biological cells using dielectrophoretic impedance measurement method combined with electropermeabilization". Sensors and Actuators B: Chemical. 2003, vol. 96(1-2). pp. 144-151.

Eric B. Cummings: Anup K. Singh; "Dielectrophoresis in Microchips Containing Arrays of Insulating Posts: Theoretical and Experimental Results", Analytical Chemistry, 2003, vol. 75, pp. 4724-4731.

Lifeng Zheng; James P. Brody: Peter J. Burke; "Electronic manipulation of DNA, proteins, and nanoparticles for potential circuit assembly", Biosensors and Bioelectronics, 2004, vol. 20, pp. 606-619.

Blanca H. Lapizco-Encinas; Blake A. Simmons; Eric B. Cummings; Yolanda Fintschenko; "Dielectrophoretic Concentration and Separation of Live and Dead Bacteria in an Array of Insulators", Analytical Chemistry, 2004, vol. 76, pp. 1571-1579.

Blanca H. Lapizco-Encinas; Blake A. Simmons; Eric B. Cummings; Yolanda Fintschenko; "Insulator-based dielectrophoresis for the selective concentration and separation of live bacteria in water", Electrophoresis, 2004, vol. 25. pp. 1695-1704.

Demir Akin; Haibo Li; Rashid Bashir; "Real-Time Virus Trapping and Fluorescent Imaging in Microfluidic Devices", Nano Letters, 2004, vol. 4, No. 2, pp. 257-259.

* cited by examiner

INSULATOR-BASED DEP WITH IMPEDANCE MEASUREMENTS FOR ANALYTE DETECTION

ACKNOWLEDGEMENT OF GOVERNMENT SUPPORT

The United States Government has a paid-up license in this invention and the right in limited circumstances to recluire the patent owner to license to others on reasonable terms as provided for by the terms of contract DE-AC04-94AL85000 awarded by the U.S. Department of Energy to Sandia Corporation.

BACKGROUND OF THE INVENTION

1. Field of the Invention

The present invention is directed to methods and devices for analyte concentration and detection using insulator-based dielectrophoresis (iDEP) and impedance-based particle detection (IM).

2. Description of the Related Art

Bioterrorism demands rapid and accurate monitoring of water and the environment for safety and quality. To detect bioagents at low concentrations in samples, techniques that selectively, accurately and rapidly collect, concentrate and detect the bioagents are necessary. Unfortunately, prior art methods take fifteen to twenty minutes before detection. See Stachowiak et al (2005) ASME Internat'l Mech. Engineer. Congress Exp., Orlando, Fla.

Dielectrophoresis (DEP) allows the rapid collection of analytes from large volume samples as compared with conventional mechanical filtering approaches. DEP is the motion of particles driven by conduction effects in a nonuniform electric field which can be used to transport suspended particles with either oscillating (AC), steady (DC), or mixed AC/DC electric fields. DEP may be used to collect specific types of particles rapidly and reversibly based on their size, shape, conductivity and polarizability.

Many device architectures and configurations have been developed to sort a wide range of biological particles by DEP. Typical dielectrophoretic devices employ an array of thin-film interdigitated electrodes placed within a flow channel to generate a nonuniform electric field that interacts with particles near the surface of the electrode array. See Yang et al. (1999) Anal. Chem. 71(5):911-918. These electrode-based DEP devices have been shown to be effective for separating and concentrating cells, proteins, DNA, and viruses. See Markx et al. (1994) J. Biotech. 32(1):29-37; Zheng et al. (2004) Biosens. Bioelect. 20:606; Washizu et al. (1990) IEEE Trans. Indust. Appl. 26:1165-1171; and Akin et al. (2004) Nano Lett. 4(2):257-259.

The concept of DEP coupled with impedance measurements (DEPIM) was first introduced by Suehiro et al. See Suehiro et al. (2003) J. Electrostatics 57(2):157-168; Suehiro et al. (2001) IEEE 36th Annual Meeting of the Industry-Application-Society (IAS), Chicago, Ill.; Suehiro et al. (2003) J. Electrostatics 58(3-4):229-246; and Suehiro et al. (2003) Sensors and Actuators B: Chemical 96(1-2):144-151. Suehiro et al. showed that impedance measurements can be effective to detect electroporation of cells and to specifically detect bacteria with a combined antibody-antigen reaction.

Unfortunately, DEPIM is problematic for various reasons including those associated with conventional DEP. The problems encountered are associated with microfabricated electrodes that are used to separate and concentrate submicron particles as the electrodes generate large electric fields in their proximity. The large electric fields and electrochemical effects may cause fouling, e.g. clumping of particles and affixation to channel walls and electrode surfaces, which detrimentally affect performance. Further, channel heights of prior art DEP devices are limited as they are dependent on the rapid dissipation of electric fields above electrode surfaces. Thus, high-throughput of particles using conventional DEP methods is limited.

Suehiro (2003) describes DEP trapping using interdigitated electrodes. Particles are detected by measuring impedance changes that determine the presence of "pearl chains," linear clusters of particles formed by dipolar alignment. These clusters of particles are formed at the site of trapping. The impedance changes occur as a result of these pearl chains forming an electrical connection between electrodes. The conductive properties of the particles relative to those of the suspending medium determine the observed changes in impedance. The electrodes are metal (chrome) and are not passivated. Suehiro discusses coating with antibodies to promote adhesion to the electrode surface.

The challenge with using traditional DEP and impedance measurement by employing collocated electrodes is that the system cannot have very high volumetric throughput coupled with a likelihood of chip fouling. These limitations arise because the power needed to drive DEP with high throughput would induce delamination of the electrodes due to thermal expansion from joule heating. Additionally, the drive frequency for the DEP device may be fundamentally different than what is used for the IM in terms of both amplitude and frequency.

Thus, a need still exists for methods and devices suitable for the rapid and continuous concentration, delivery, and detection of low concentration analytes.

SUMMARY OF THE INVENTION

Disclosed herein are methods and devices for analyte concentration and detection using insulator-based dielectrophoresis (iDEP) and impedance-based particle detection (IM).

In some embodiments, the present invention provides a microfluidic device for assaying at least one analyte specie in a sample comprising at least one analyte concentration area in a microchannel having insulating structures on or in at least one wall of the microchannel which provide a nonuniform electric field in the presence of an electric field provided by off-chip electrodes; and a pair of passivated sensing electrodes for impedance detection in a detection area. In some embodiments, the microfluidic device further comprises a second microfluidic channel. In some embodiments, the detection area is the same as or overlaps with the analyte concentration area. In some embodiments, the detection area is located in the second microchannel. In some embodiments, the pair of passivated sensing electrodes act as reference electrodes. In some embodiments, the microfluidic device further comprises a pair of reference electrodes. In some embodiments, the pair of passivated sensing electrodes provides a voltage source for the impedance detection. In some embodiments, the microfluidic device further comprises a pair of impedance voltage source electrodes. In some embodiments, the impedance detection is electrical impedance tomography (EIT) or impedance spectroscopy. In some embodiments, the voltage source for the impedance detection is provided by one or more of the off-chip electrodes. In some embodiments, the microfluidic device further comprises a second analyte concentration area which is the same as, overlaps with or different from the detection area. In some embodiments, the insulating structures are in a patterned array. In some embodiments, at least two insulating structures are on or in opposing walls of the microchannel. In some embodiments, the microfluidic device further comprises two or more microfluidic inlet ports. In some embodiments, at least one of the microfluidic inlet ports lacks an off-chip electrode. In some embodiments, the microfluidic channel is fabricated from a polymer substrate, preferably a cyclic olefin copolymer such as Zeonor®.

In some embodiments, the present invention provides a method of assaying at least one analyte specie in a sample which comprises using a device as described herein for concentrating the analyte specie using insulator-based dielectrophoresis (iDEP); and measuring the impedance of the concentrated analyte specie with the pair of passivated sensing electrodes. In some embodiments, the microfluidic device comprises at least one analyte concentration area in a microchannel having insulating structures on or in at least one wall of the microchannel which provide a nonuniform electric field in the presence of an electric field provided by off-chip electrodes; and a pair of passivated sensing electrodes for impedance detection in a detection area. In some embodiments, the microfluidic device further comprises a second microfluidic channel. In some embodiments, the detection area is the same as or overlaps with the analyte concentration area. In some embodiments, the detection area is located in the second microchannel. In some embodiments, the pair of passivated sensing electrodes act as reference electrodes. In some embodiments, the microfluidic device further comprises a pair of reference electrodes. In some embodiments, the pair of passivated sensing electrodes provides a voltage source for the impedance detection. In some embodiments, the microfluidic device further comprises a pair of impedance voltage source electrodes. In some embodiments, the impedance detection is electrical impedance tomography (EIT) or impedance spectroscopy. In some embodiments, the voltage source for the impedance detection is provided by one or more of the off-chip electrodes. In some embodiments, the microfluidic device further comprises a second analyte concentration area which is the same as, overlaps with or different from the detection area. In some embodiments, the insulating structures are in a patterned array. In some embodiments, at least two insulating structures are on or in opposing walls of the microchannel. In some embodiments, the microfluidic device further comprises two or more microfluidic inlet ports. In some embodiments, at least one of the microfluidic inlet ports lacks an off-chip electrode. In some embodiments, the microfluidic channel is fabricated from a polymer substrate, preferably a cyclic olefin copolymer such as Zeonor®. In some embodiments, two or more analytes of different species are simultaneously or sequentially concentrated, their impedances are measured simultaneously or sequentially, or a combination thereof. In some embodiments, the analytes are concentrated in the same or different concentration areas. In some embodiments, the impedances are measured in the same or different detection areas.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

This invention is further understood by reference to the drawings wherein.

DETAILED DESCRIPTION OF THE INVENTION

Figure 1:
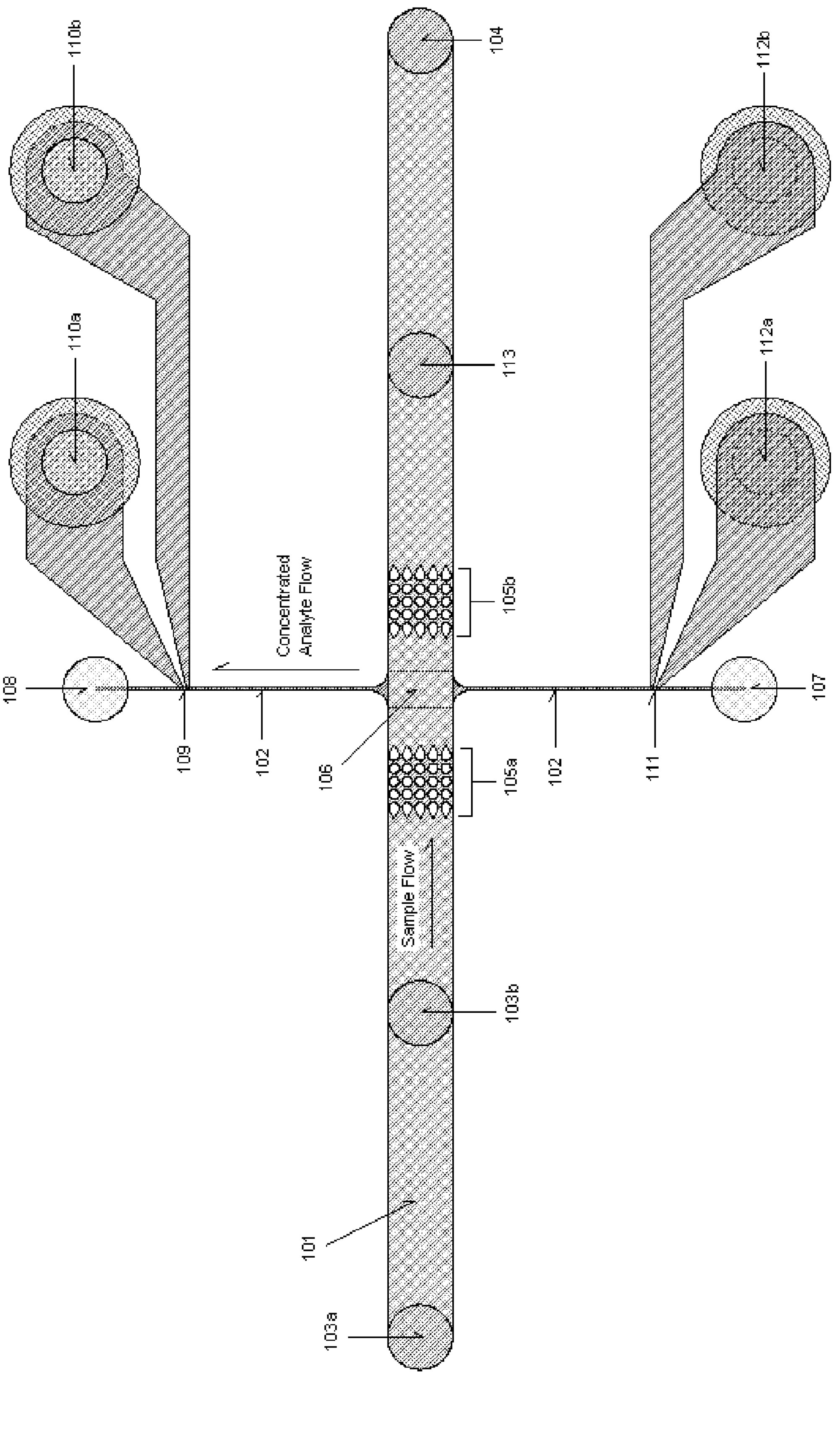
FIG. 1 shows a schematic of a microfluidic device according to the present invention.

The present invention provides methods and devices for assaying analytes in a fluid sample which comprise concentrating the analytes using insulator-based dielectrophoresis (iDEP) and detecting the analytes by impedance (IM) measurements. In particular, insulating structures integrated in or on a channel wall are used to create a non-uniform electric field by which the analytes are concentrated, separated, or both according to methods known in the art. See U.S. Patent Publication Nos. 200040026250 and 200050072676, Cummings & Singh (2000) SPIE: Conference on Microfluidic Devices and Systems ITT, Santa Clara, Calif., Proc. SPIE; Cummings & Singh (2003) Anal. Chem. 75:4724-4731; Lapizco-Encinas et al. (2004) Anal. Chem. 76(6):1571-1579;

Lapizco-Encinas et al. (2004) Electrophoresis 25:1695-1704; Lapizco-Encinas et al. (2005) J. Microbiological Methods 62:317-326; and McGraw et al. (2005) SPIE Proceedings: MOEMS-MEMS, San Jose, Calif.; which are herein incorporated by reference. As provided herein, the present invention couples iDEP with IM. Prior art methods have used DEP (which is non-insulator-based) with IM (DEPIM), but not iDEP with IM (iDEPIM). As provided herein, impedance detection methods includes electrical impedance tomography-based detection (EIT) and impedance spectroscopy. See Gale & Frazier (1999) Proc. SPIE Symposium on Micromachining and Microfabrication, Santa Clara, Calif. September 20-21, pp 190-201 and Carstensen et al. (1979) J. Bacteriol. 140(3):917-928, which are herein incorporated by reference.

As used herein, "off-chip electrodes" refers to electrodes that are not integrated with the substrate material in which the microfluidic channels are formed.

As used herein, "channel" refers to a structure wherein a fluid may flow. A channel may be a capillary, a conduit, a strip of hydrophilic pattern on an otherwise hydrophobic surface wherein aqueous fluids are confined, and the like. As used herein, "microfluidic" refers to a system or device having one or more fluidic channels, conduits or chambers that are generally fabricated at the millimeter to nanometer scale. Thus, the "microfluidic channels" or alternatively referred to herein as "microchannels" of the present invention generally have cross-sectional dimensions ranging from about 10 nm to about 1 mm. As provided herein, the microfluidic channels are formed in a substrate made of insulative material(s), such as polymers, glass, and the like. In some embodiments, on-chip electrodes were deposited on the substrate using a titanium promotion layer known in the art.

As used herein, a "fluid" refers to a substance that tends to flow and to conform to the outline of a container such as a liquid or a gas. Fluids include saliva, mucus, blood, plasma, urine, bile, breast milk, semen, tears, water, liquid beverages, cooking oils, cleaning solvents, hydrocarbon oils, fluorocarbon oils, ionic fluids, air, and the like. Fluids can also exist in a thermodynamic state near the critical point, as in supercritical fluids. If one desires to test a solid sample for a given analyte according to the present invention, the solid sample may be made into a fluid sample using methods known in the art. For example, a solid sample may be dissolved in an aqueous solution, ground up or liquefied, dispersed in a liquid medium, melted, digested, and the like. Alternatively, the surface of the solid sample may be tested by washing the surface with a solution such as water or a buffer and then testing the solution for the presence of the given analyte.

As used herein, "analyte" is used interchangeably with "particle" to refer to a particle that may be natural or synthetic chemicals and biological entities. Chemicals and biological entities (biomolecules) include industrial polymers, powders, latexes, emulsions, colloids, environmental pollutants, pesticides, insecticides, drugs such as cocaine and antibiotics, magnetic particles, high-magnetic-permeability particles, metal ions, metal ion complexes, inorganic ions, inorganic ion complexes, organometallic compounds, metals including aluminum, arsenic, cadmium, chromium, selenium, cobalt, copper, lead, silver, nickel, and mercury, and the like, amino acids, peptides, proteins, glycoproteins, nucleotides, nucleic acid molecules, carbohydrates, lipids, lectins, cells, viruses, viral particles, bacteria, organelles, spores, protozoa, yeasts, molds, fungi, pollens, diatoms, toxins, biotoxins, hormones, steroids, immunoglobulins, antibodies, supermolecular assemblies, ligands, catalytic particles, zeolites, and the like, biological and chemical warfare agents, agents used in explosives, and the like.

As used herein, "concentrating" refers to the reduction of fluid volume per particle in the fluid. The methods and devices of the present invention allow a fluid to be concentrated or diluted. When the methods and devices are used to concentrate a fluid, it is noted that particles in one portion of the fluid becomes "concentrated" and that particles in the second portion of the fluid becomes "diluted".

As used herein, "separating" refers to removing a given analyte from its initial environment which may include removing analytes of one or more species of interest from analytes of different or other species. Separating an analyte in a fluid results in concentration of the analyte and dilution of the analyte in the fluid.

As provided herein, analytes in a sample are concentrated by iDEP and detected by impedance measurements. In some embodiments, after the analytes are concentrated, the concentrated analytes are detected in a detection area by impedance measurements. In some embodiments, impedance is monitored in real-time. Impedance measurements include measuring any observable changes in conductivity (AC, DC, or both) between a pair of electrodes over a period of time and measuring differences in conductivity between a pair of sensing electrodes and a pair of reference electrodes. In some embodiments, the sensing electrodes also act as reference electrodes. In some embodiments, the sensing electrodes also act as the source of the voltage signal. In some embodiments, a first set of electrodes is used as the sensing electrodes and a second set of electrodes is used as the source of the voltage signal. In some embodiments, one or more of the electrodes used for inducing the iDEP field for concentrating the analytes may be used to supply the voltage signal needed for impedance detection. In these embodiments, the sensing electrodes are used to measure impedance and need not provide a voltage signal. As used herein, an "impedance voltage source electrode" refers to an electrode which supplies a voltage signal used for impedance detection. In embodiments where detection is by EIT multiple electrodes are used.

In some embodiments, for iDEP concentration, an electric field is made non-uniform by insulating structures on or in the wall of the microchannel. In some embodiments, the insulating structures are provided in patterned array, e.g. a desired number of rows and columns on or in at least one microchannel wall in at least one microchannel segment. In these embodiments, the sensing electrodes are located at or near the wall where the insulating structures are provided at opposite sides of the patterned array.

In other embodiments, the insulating structures are provided on or in at least two opposing microchannel walls in a microchannel segment. In these embodiments, one of the sensing electrodes is located at or near one microchannel wall having insulating structures and the other sensing electrode is located at or near the opposing microchannel wall having insulating structures. In these embodiments, only one insulating structure is required to be present on each of the opposing walls; however, more than one insulating structure may be present on each of the opposing walls in any desired pattern. In some embodiments, the distance between the microchannel walls having the insulating structures are about 1 mm to about 0.250 mm apart. It should be noted that the distance between the microchannel walls having the insulating structures may be readily modified by those skilled in the art to optimize impedance measurements.

Figure 3:
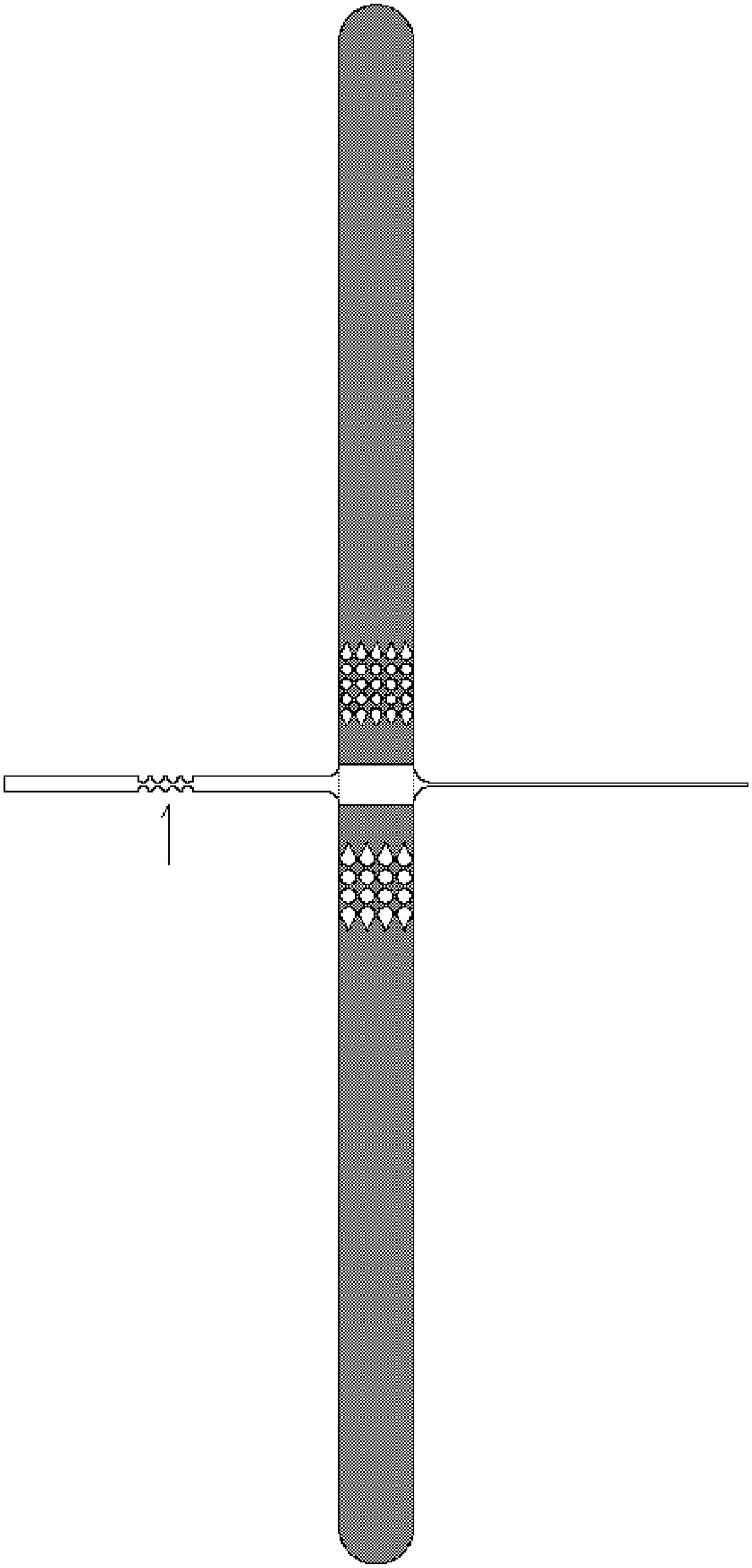
FIG. 3 shows a schematic of an alternative microfluidic device of the present invention wherein the features in the device in FIG. 2 and incorporated into the secondary (detection) channel of a device similar to the one depicted in FIG. 1 (via holes and detection electrodes are not shown).
Figure 4A:
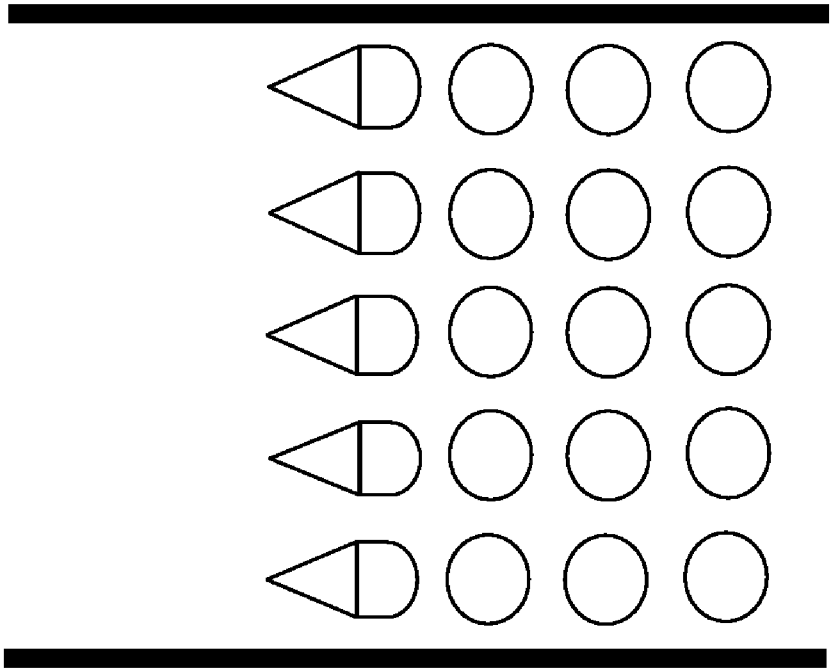
FIG. 4A schematically represents an array of insulating structures in a microchannel according to the present invention.
Figure 4B:
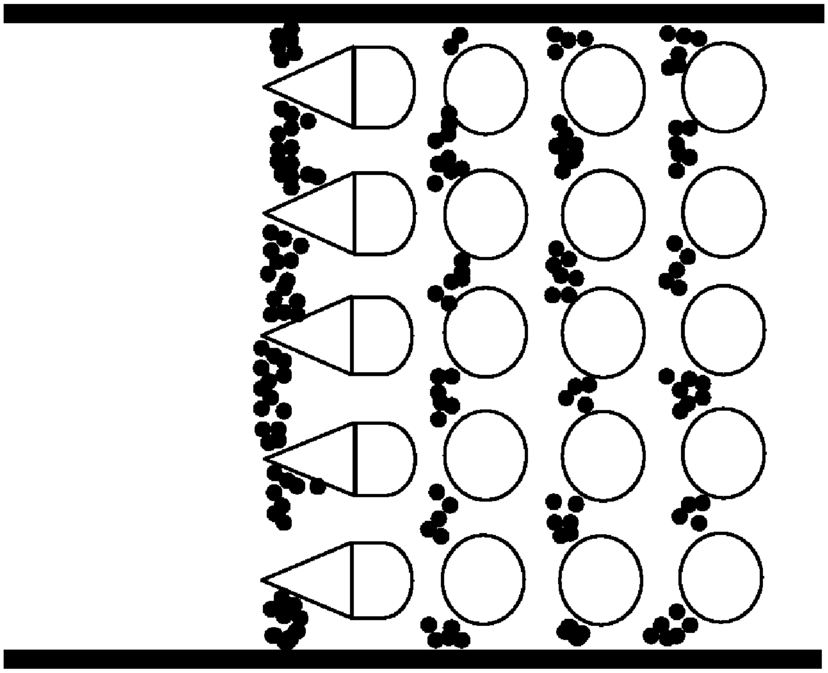
FIG. 4B schematically illustrates particles being trapped by iDEP in the array of insulating structures provided in FIG. 4A. The applied field direction is from left to right and the fluid flow is from left to right.

In some embodiments, after the analytes are concentrated by iDEP, the concentrated analytes are moved to a detection area wherein sensing electrodes are located for measuring impedance. In some embodiments, the detection area further comprises insulating structures on or in the walls of the detection area. See e.g. FIG. 3. In these embodiments, additional concentration by iDEP of the analytes may occur in the detection region by electrodes opposite ends of the detection region in order to produce the AC current necessary for iDEP. Thus in accordance with the device shown in FIG. 1, an additional electrode may be installed at the intersection of the primary microchannel and the detection area. The AC current in the detection area is preferably scaled, using methods known in the art, in relation to the field non-uniformity across the length of the primary microchannel to compensate for the smaller dimensions of the detection area as compared to the primary microchannel.

It should be noted that the number, size, material, shape, and the like, of insulating structures may be readily adjusted by those skilled in the art for operational reasons (e.g. to change the electric field gradient intensities, to constrict flow, and the like) or optimizing conditions.

In some embodiments, the detection area is located in a second microchannel segment. In some embodiments, the detection area is located in a second microchannel which is in fluidic communication with the microchannel having the microchannel segment containing the array of insulating structures. In some embodiments, the devices further comprise a pair of electrodes which are capable of providing an electric field which will move the analytes from the collection area to the detection area. In some embodiments, the devices further comprise a control area and a pair of reference electrodes capable of measuring the conductivity in the control area.

In some embodiments, the insulating structures are posts (ranging in diameter from about 0.150 to about 0.230 mm and spaced about 0.2 mm center-to-center from one another) fabricated in Zeonor® (Zeon Chemicals, Tokyo, Japan), a commercially available cyclic olefin copolymer (COC). Those skilled in the art, however, may readily employ insulating structures of other insulative materials, shapes and sizes using methods known in the art.

In some embodiments, one type (a first specie) of analyte may be separated from another type (a second specie) of analyte and concentrated using methods known in the art. It should be noted that more than two different species may be separated, concentrated and detected in accordance herein. In these embodiments, the first specie of analyte may be separated, concentrated and moved to the detection area after which the second specie of analyte may be separated, concentrated and detected. When only one set (array) of insulating structures is used, one may separate the first specie of analyte from the second specie of analyte using certain parameters, such as voltage, which are sufficient to trap one specie without trapping the other. In addition, when only one set of insulating structures is used, both analyte species may be concentrated simultaneously when trapping conditions for both species are met. The parameters can be adjusted (e.g. voltage changed) to retain one analyte type while the second analyte is trapped and adjusted further to release the second analyte. It is also possible to have different trapping sites which are tailored to trap one species over another (i.e. one set of posts traps species 'B' and the other set traps 'A' and 'C' or 'A' 'B' and 'C').

In some embodiments, different species of analytes may be separated, concentrated, detected, or a combination thereof by using two or more sets (arrays) of insulating structures. For example, a first array of insulating structures may comprise insulating structures different from those of a second array of insulating structures such that the differences create different non-uniform electric fields which separate and concentrate analytes of different species. The differences between the insulating structures include size, shape, number, pattern, material, and the like. Different non-uniform electric fields may also be induced by application of different electrical currents.

In some embodiments, the concentrated analytes are moved to the detection area by applying a mobilization field. As used herein, "mobilization field" refers to any force field that influences a particle to pass through a channel or region of a channel. Mobilization fields include hydrodynamic flow fields produced by pressure differences, gravity, linear or centripetal acceleration, electrokinetic flow fields, electroosmotic flow fields, magnetophoretic and thermophoretic flow fields, electric fields, optical fields, centrifugal fields, gravitational fields, combinations thereof, and the like which are applied using methods known in the art. In some embodiments, the mobilization field is an electric field.

In some embodiments, any observable difference in impedance in the detection area is determined by measuring any observable change in impedance over a period of time or by measuring the difference in impedance in the detection area between the impedance in a control area.

Impedance may be measured in the detection area with electrodes using methods known in the art. In some embodiments, the electrodes are passivated electrodes, i.e. a conductive material coated with an insulative material, using methods known in the art, to avoid problems associated with direct metal-liquid contact.

In some embodiments, the electrodes comprise a conductive material, such as a metal including Au, Ti, Ag, Pt, and combinations thereof, and the like, which are passivated by an insulative material known in the art. In some embodiments, the electrodes are Ti/Au layered electrodes passivated with $SiO_2$. However, it is noted that those skilled in the art may readily select the electrode materials based on given operating conditions.

As used herein, the word "conductivity" is used to describe the ease of flow of both conduction and displacement current. It is often mathematically described as a complex number that varies with the frequency of the applied electric field. Similarly, "conduction" is used to describe both conventional conduction and conduction of displacement currents. As used herein, "insulative" and "conductive" refer to the relative conductivity of the described item with respect to the fluid. Insulative materials have relatively low conductivity and include plastics, epoxies, photoresists, polymers, silicon and oxides and nitrides thereof, silica, quartz, glass, controlled pore glass, carbon, and the like, and combinations thereof. Preferred insulative materials include thermoplastic polymers such as nylon, polyolefin, polymethylmethacrylate, polypropylene, polyester, polycarbonate and the like. Conductive materials, in comparison, have relatively high conductivity. Conductive materials include bulk, sputtered, and plated metals and semiconductors, carbon nanotubes, and the like.

In some embodiments, the sensing electrodes comprise gold with a titanium promotion layer both protected with a passivation layer. In some embodiments, the dimensions of the sensing electrodes at or near the microchannel walls range from about 5 to about 500 μm in width or diameter. In some embodiments, the sensing electrodes are rectangularly shaped. In some embodiments, the sensing electrodes are spaced about 5 to about 500 μm from each other. It should be noted, however, that those skilled in the art may readily employ sensing electrodes of a desired material, size, shape and distance using methods known in the art.

When the impedance between the detection area and the control area is measured, substantially similar, if not the same, conditions exist in the detection area should be the same or substantially similar as in the control area. For example, where sensing electrodes are used in the detection area, reference electrodes are used in the control area. The reference electrodes should be of the same material, size, shape and distance as the sensing electrodes and any medium or solution in which the analytes are concentrated should be present in the control area.

A schematic of the microfluidic device exemplified herein is shown in FIG. 1. Those skilled in the art may make modifications to the device configuration exemplified herein using methods known in the art. As shown in FIG. 1, a primary microchannel 101 is perpendicularly intersected by a secondary microchannel 102. The electrode connected to microchannel inlet 103*a* is connected to a positive voltage terminal and the electrode connected to microchannel inlet (outlet) 104 is electrically grounded. A sample may be introduced into the primary microchannel 101 by an inlet port 103*a* or 103*b*. A buffer may be introduced by inlet port 103*a* prior, during, after or a combination thereof sample introduction by inlet port 103*b*. During analyte concentration, the sample is introduced at a fixed flow rate and the threshold voltage, Vth, is applied from microchannel inlet 103*a* to microchannel inlet 104, such that the sample flows from the inlet port 103*b* to an array of insulating structures 105*a* where the analytes in the sample become concentrated. Fluid flow may be allowed through or between ports 107 and 108, wherein electrodes in these ports are allowed to float. A second array of insulating structures 105*b* may be present or absent. The array of insulating structures (105*a* and 105*b*) induce the electric field gradients used in iDEP. After the analytes are concentrated in the array of insulating structures, 105*a* or 105*b*, or both, fluid flow from inlet ports 103*a* and 103*b* is stopped and the voltage difference across the primary microchannel is maintained.

To divert the concentrated analytes through the secondary microchannel 102 to port 108, the voltage at the microchannel inlet 104 is raised while fluid flow to it is blocked. Then the voltage at port 108 is changed from floating to ground, thereby causing the concentrated analytes to move through area 106 to port 108 through a detection area 109. The impedance of the detection area 109 having analytes concentrated therein measured by a pair of sensing electrodes 110*a* and 110*b* is compared with the impedance of the control area 111 having no analytes measured by a second pair of sensing electrodes 112*a* and 112*b*. Port 113 is a port for the fluid of the sample injected at inlet port 104 or alternatively, a second inlet port for a second sample comprising analytes the same or different to those to be concentrated at concentration region 105*b* and detected at detection region 109 or 111.

In some embodiments, multiple inlet ports may be provided to control the fluid flow; for example, an inlet port may exist at the intersection of the microchannel segments to further adjust the voltage level or to act as a fluidic sink.

In some embodiments, one or more reservoirs in fluidic communication with the microchannels described herein may be provided. The reservoirs may be used to store reagents, test samples, provide areas of further sample processing, and the like.

As provided herein, the length, width and depth of the primary microchannel 101 length is about 2 cm, about 1000 μm, and about 90 μm (or about 30 μm) respectively and the length, width and depth of the secondary microchannel is about 1 cm, about 50 μm and about 30 μm, respectively. However, it should be noted that the dimensions of the microchannels may be readily optimized by those skilled in the art. The sensing electrodes (110*a*, 110*b*, 112*a* and 112*b*) preferably cover the width of the secondary microchannel and are preferably about 50 μm in length each. The separation between sensing electrodes (110*a*, 110*b*, 112*a* and 112*b*) in each pair is about 150 μm. In some embodiments, the sensing electrodes (110*a*, 110*b*, 112*a* and 112*b*) are composed of layered Ti/Au. In some embodiments, the sensing electrodes are passivated with about a 0.4 μm thick oxide (SiO2) layer.

Figure 2:
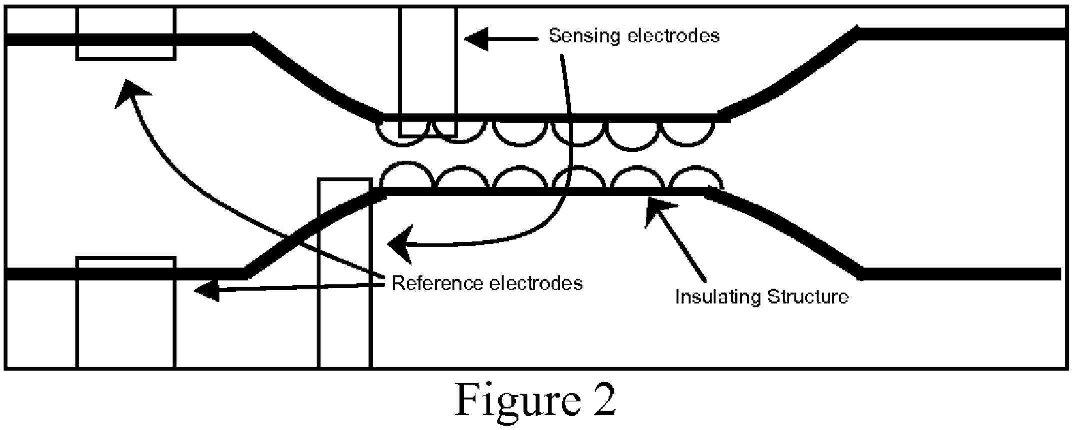
FIG. 2 shows a schematic of an alternative microfluidic device of the present invention wherein analytes in a sample are concentrated and detected in the same area of a microchannel.

In some embodiments, analytes in a sample are concentrated in a first area of a microchannel and then the concentrated analytes are detected in a second area of the same or different microchannel as exemplified in FIG. 1. However, in some embodiments, analytes in a sample are concentrated and detected in the same area of a microchannel. For example, in FIG. 2, four electrodes are placed in a microchannel. Two sensing electrodes are placed in the area where the analytes are concentrated and detected and two reference electrodes are placed downstream (as a control, to normalize for any potential drift). Where the potential across the sensing electrodes changes faster than the potential of the reference electrodes, analytes are being concentrated and detected. In these embodiments, an electric field is applied perpendicular to the sensing electrodes across the length of the microchannel.

Where analytes being sensed have a different conductivity from the solution, the effective conductivity between sensing electrodes changes as the analytes are trapped and reverts when the analytes are released. See Schwan (1957) Adv. Biol. Med. Phys. 5:147-209, which is herein incorporated by reference. The change in conductivity can be used to estimate the number of analytes collected in the area of the sensing electrodes using methods known in the art.

The effective (bulk) conductivity of a dilute cell suspension can be approximated using the following equation $$\frac{\sigma_e - \sigma}{2\cdot\sigma_e + \sigma} = f(n)\cdot\frac{\sigma_e - \sigma_p}{2\cdot\sigma_e + \sigma_p} \tag{3}$$

which can be rewritten as $$\sigma(n) := -\sigma_e\cdot\frac{2\cdot\sigma_e + \sigma_p - 2\cdot f(n)\cdot\sigma_e + 2\cdot f(n)\cdot\sigma_p}{-2\cdot\sigma_e - \sigma_p - f(n)\cdot\sigma_e + f(n)\cdot\sigma_p} \tag{4}$$

where $\sigma_e$ is the conductivity of the external medium, $\sigma_p$ is the conductivity of the analyte, σ is the effective conductivity and f is the volume fraction of the analytes dispersed in the medium.

$$f(n) := \frac{n\cdot V_c}{V} \tag{5}$$

where $V_c$ is the volume of an analyte, V is volume of the solution and n is the number of analytes.

The volume of a spherical analyte can be defined as:

$$V_c := \frac{4}{3}\cdot\pi\cdot 1\cdot 10^{-18} \tag{6}$$

Equations (3-5) have been shown to be an adequate approximation for larger analyte suspension volume fractions as well. See Pavlin & Miklavcic (2003) Biophysical J. 22:719-719, which is herein incorporated by reference.

Model

The electric field distribution in the microchannel is governed by the Laplace equation:

$$\nabla\cdot(\nabla\phi)=0$$

where sigma is the electrical conductivity and phi is the electric potential.

The boundary conditions are insulating on all the walls of the microchannel, a normalized DC ($V/V_o$) applied voltage of 1 at the inlet and ground at the outlet. The model assumed analyte conductivities that are ratios of the fluid comprising the analytes and the fluid and device configurations wherein the insulating structures are provided on or in at least two opposing microchannel walls in a microchannel segment.

Device Fabrication

The microchannels having insulating structures according to the present invention are known in the art. See Cummings & Singh (2003) Anal. Chem. 75:4724-4731. The microchannels of the present invention may be of any desired shape and length. However, in some embodiments, the microchannels are about 1 mm wide, about 10.2 mm long, and about 0.075 mm deep and have an array of insulating structures. The array of insulating structures may be of any desired shape and arranged in any desired pattern which are suitable for trapping particles. However, in some embodiments, the array of insulating structures are arranged columns spaced about 0.250 mm center-to-center and traverse the entire depth of the microchannel and the insulating structures are circular posts about 0.200 mm in diameter. In some embodiments, the insulating structures positioned on the ends of the array taper outward to reduce fouling.

Polymer substrates comprising the microchannels having an array of insulating structures for use in accordance with the present invention may be made by methods known in the art. The polymer substrates used in the devices exemplified herein were made as described below.

A. Replication Tool

Figure 5A:
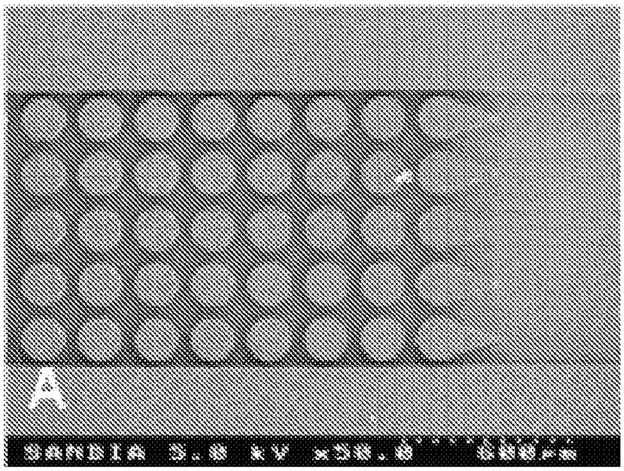
FIG. 5 shows an image depicting the fabrication route of a polymer-based iDEP device from the (a) initial silicon features to (b) electroformed nickel stamp and finally to (c) injection molded polymer replicate.
Figure 5B:
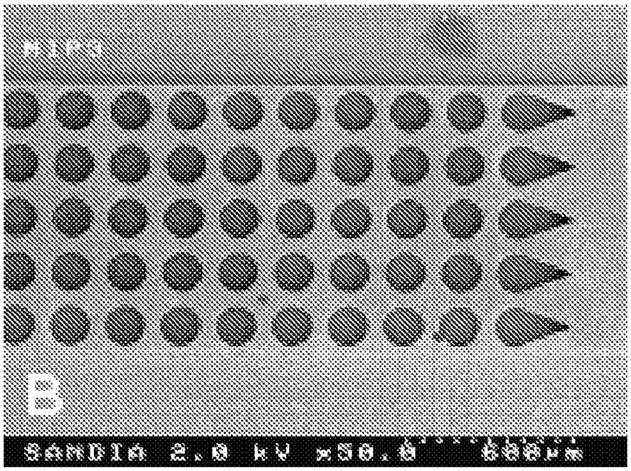

A custom stamp with a negative of the microchannels (having a patterned array of structures) on its surface was created to injection mold the substrates. FIG. 5A is a micrograph of a portion of the silicon master which shows the negative of a section of a microchannel (having a patterned array of structures). FIG. 5B is a micrograph of a nickel stamp fabricated from the silicon master substrate shown in FIG. 5A.

To make the nickel stamp of FIG. 5B from the silicon master shown in FIG. 5A, the silicon master substrate was sputter coated using methods known in the art with 500 Å of chrome (for adhesion promotion) and 1500 Å of copper; however, other electroplating base materials known in the art may be used. The silicon master substrate was then placed into a commercially available electroplating machine such as that available from Digital Matrix Corp. (Hempstead, N.Y.). The bath chemistry utilized was a standard nickel sulfamate solution at about a pH 4, but other solutions known in the art may be employed. Electroplating occurred at 48° C. for a total of 40 amp-hours to produce a nickel film on the silicon master substrate having a thickness of about 1 mm. The nickel film was removed to result in a nickel stamp which was then machined to fit into an injection molding device commercially available using methods known in the art. The nickel stamp was then examined characterized using methods known in the art.

B. Polymer Replication

Figure 5C:
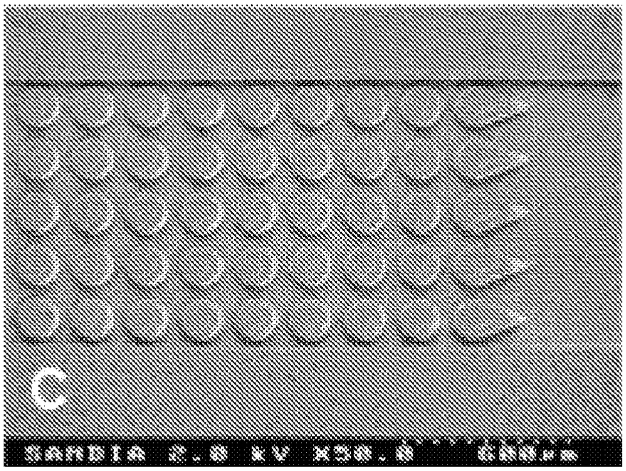

Polymer substrates were injection molded from Zeonor® 1060 resin (Zeon Corp., Tokyo, Japan) using the nickel stamp described above. Injection molding was carried out utilizing a 60-ton Nissei® TH-60 vertical injection molding machine (Nissei® America, Los Angeles, Calif.) using methods known in the art. Pellets of Zeonor® 1060R resin (Zeon Chemicals, Louisville, Ky.) were dried at 40° C. for at least about 24 hours before use. The resin was then fed to the machine through a gravity-assisted hopper connected externally to the injection molding barrel. The operational conditions were optimized using methods known in the art. Cross-polarized optical interrogation of the polymer substrates was employed to assess and minimize residual stresses in the injection molded parts using methods known in the art. FIG. 5C shows a micrograph of the injection molded polymer substrate resulting from the nickel stamp shown in FIG. 5B.

Since the nickel stamp is a negative of the silicon master, the silicon master and the injection molded polymer substrate contain the same microchannels and structures.

C. Device Lids 1.6-mm thick discs of Zeonor® 1060R from Zeon Chemicals (Louisville, Ky.) were used as lids to seal the microchannels in the polymer substrates. 1-mm diameter holes were drilled through the discs using a Uniline-2000 drill (Excellon Automation Co., Rancho Dominguez, Calif.) to provide fluidic and electrical interfaces to the microchannels.

In some embodiments, the devices of the present invention comprise rounded port holes to minimize edge effects during trapping voltage application. Since DEP is the result of a nonuniform electric field, a sharp edge creates a high-DEP field near the microfluidic port that is undesirable. Thus, fillets were used to minimized edge effects.

A Ti/Au electrode layer was deposited on the lid using a shadow mask and methods known in the art. The typical thickness of metal deposition for each layer is about 0.01 to about 5 μm. The desired thickness may be readily selected by those skilled in the art. The polymer substrates containing the microchannels were then thermally bonded to the lids containing the holes using a Carver press (Carver, Inc., Wabash, Ind.). Bonding conditions were held constant at the following: the press was heated to about 190° F. with a constant applied load of about 750 psig and a corresponding cycle time at temperature of about 60 minutes. The bonded assembly was then cooled to about 75° F. under constant load and then removed from the press. All bonded assemblies were checked for flow and channel blockage before use.

D. Device Manifold

A bonded assembly was mounted on a manifold containing fluidic interfaces, electrical interfaces, or both, for the holes provided in the lid. Such manifolds are known in the art and are readily made by those skilled in the art or commercially available. See e.g. Fluxion Biosciences, Inc., San Francisco, Calif.

EXAMPLE 1 iDEP Concentration

The necessary applied voltage for causing effective analyte concentration for different particle types may be determined using methods known in the art. For example, the minimum applied voltage required to concentrate and detect test particles, 2 μm diameter carboxylate-modified polystyrene beads (FluoSpheres™, Molecular Probes, Eugene, Oreg.) and viable *B. subtilis* spores (Raven Biological Laboratories, Omaha, Nebr.), was determined. Bead suspension samples were filtered using an appropriate pore size syringe filter to remove larger bead aggregates before use.

The test particles were suspended in a buffer solution (0.001% Tween 20, pH 8.0 (Sigma-Aldrich, St. Louis, Mo.)). The conductivity of the buffer solution was about 7 μS/cm. The buffer and test particles were mixed prior to introduction into the microchannel; however, the samples may be mixed in the microchannels (on-chip) using methods known in the art. Images were captured through optical fluorescence filters mounted on a fluorescence microscope (Olympus IX70, Tokyo, Japan). Video images were captured through a CCD camera (DFW-SX900, Sony Corporation, Tokyo, Japan).

The voltages applied for analyte separation using iDEP were supplied by a commercially available power supply, preferably a power supply that can simultaneously supply various electrodes with voltages ranging from about −1500 to about 1500 volts, e.g. a HVS488 3000D High Voltage Sequencer (Labsmith, Livermore, Calif.). When a such a multiple variable power supply is used, rapid changes in voltage may be programmed as scripts that can be rapidly executed in order to apply, simultaneously or sequentially, different voltages for analyte concentration using iDEP, moving analytes, measuring impedance, or a combination thereof.

The electrodes at the microchannel inlets 103*a* and 104 of the device shown in FIG. 1 were connected to a power supply. The primary microchannel 101 was flushed with a buffer solution (0.001% Tween 20 in deionized water) at a rate of 400 μl/min. for about 3 minutes with a peristaltic pump known in the art to clear out air bubbles and debris in the channel. Then the rate of flow was reduced to 15 μl/min. and allowed to run continuously for about 30 seconds to ensure uniform flow throughout the microchannel. The bead or spore sample to be analyzed was injected in the microchannel inlet 103*b* at a rate of 15 μl/min. using a syringe pump and monitored.

Figure 6:
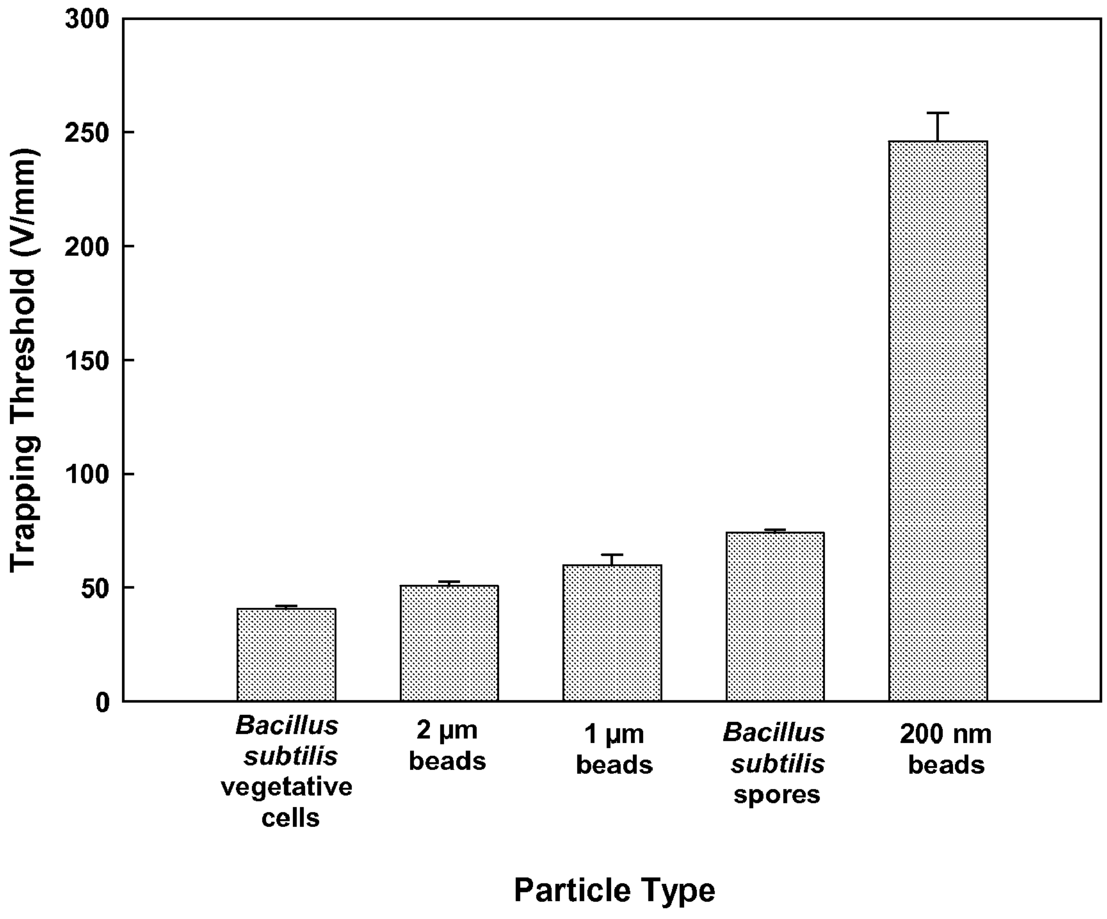
FIG. 6 shows a summary of the different magnitudes of the applied DC electric fields required to trap, defined here as the trapping threshold (y-axis), a variety of different inert and biological particle types (n=5).

The voltage at the microfluidic inlet (outlet) 104 was set to ground. For iDEP-concentration, the voltage at the electrode located at microfluidic inlet 103*a* was changed to a threshold level ($V_{th}$) for trapping the particles (beads=about 50 V/mm, spores=about 75 V/mm). A summary of threshold values is given in FIG. 6. After a given period of time, about 1 to about 2 minutes, injection of the sample and buffer solution was stopped. The concentrated particles were then moved through the insulating structures to area 106. Then the voltages at the primary channel microfluidic inlet 103*a* and the microfluidic outlet 104 were set at threshold $V_{th}$ while the electrode at port 108 was set to ground. The peristaltic pump flow rate was set to about 10 μl/min. and the particles were moved to the secondary microchannel 102.

EXAMPLE 2

Impedance Detection

After iDEP concentration as provided in Example 1 was conducted, the impedances of samples of different concentrations of viable *B. subtilis* spores (Raven Biological Laboratories, Omaha, Nebr.) suspended in the buffer solution were determined. The spore concentrations were 103/ml, 105/ml, 5×106/ml and 5×107/ml.

Figure 7:
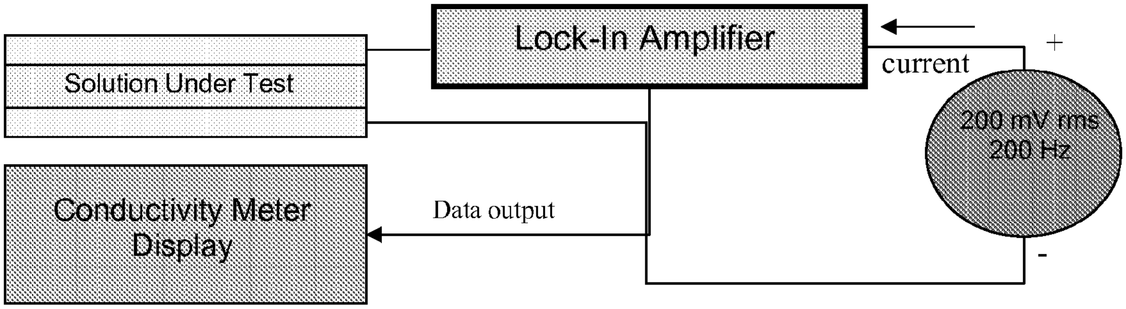
FIG. 7 is a diagram depicting the basic system used during on-chip impedance detection testing.
Figure 8:
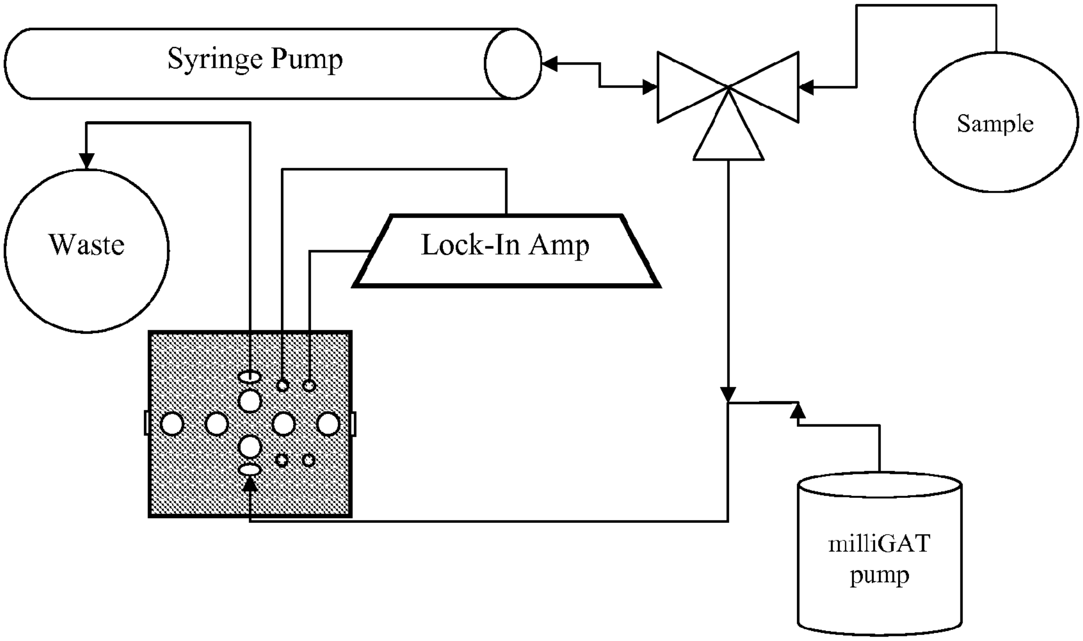
FIG. 8 is a component diagram of the overall detection system with hardware, fluid sources, and fluid sinks depicted.

Impedance detection was performed by connecting the sensing electrodes to a lock-in amplifier (SR830 Lock-In Amplifier, Stanford Research Systems, Sunnyvale, Calif.) (providing a 50-mV rms amplitude sinusoidal signal at 200 Hz) in series with a voltage-dividing resistor (measured to be 10 MΩ). The lock-in amplifier served as the AC voltage source and voltmeter. A representation of the experimental setup is shown in FIG. 7. The phase offsets were recorded as functions of the concentration of spores in the test sample being introduced into the system. The layout of the system components can be seen in FIG. 8.

Changes in measured impedance in the detection area 109 were monitored. A monotonic increase in phase offset with increasing concentration of spores in the samples was observed. Thus, the spore concentration within the detection area may be estimated from the change in phase.

Figure 9:
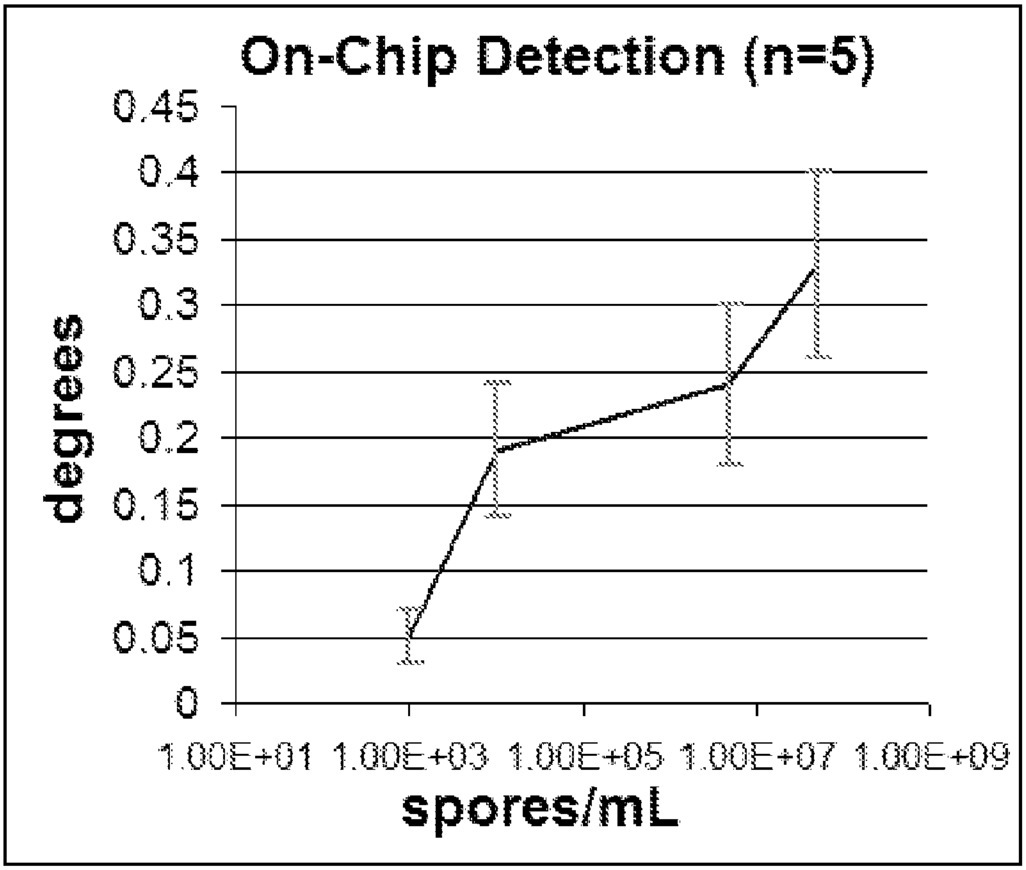
FIG. 9 is a graph showing the results from the experiments done on-chip. The applied voltage was 50 mV amplitude (rms) oscillating at a frequency of 200 Hz.

As shown in FIG. 9 and Table 2, this trend is similar to the experiments performed on the 20-ml glass vials provided in Example 3.

TABLE 2

Impedance measurements for *B. subtilis* (n = 5) at 200 Hz.

| Particle Concentration | Mean Phase Offset Relative to Clean (degrees) | |
|---|---|---|
| | Example 2 Measurements | Example 3 Measurements |
| clean (buffer) | 0.00 ± 0.00 | 0.00 ± 0.04 |
| $10^3$ spores/ml | 0.02 ± 0.04 | 4.31 ± 0.11 |
| $10^5$ spores/ml | 0.22 ± 0.03 | 8.40 ± 0.07 |
| $5 \times 10^6$ spores/ml | 0.26 ± 0.03 | 16.01 ± 0.19 |
| $5 \times 10^7$ spores/ml | 0.33 ± 0.07 | 17.15 ± 0.12 |

EXAMPLE 3

Conventional Bulk Solution Impedance Detection

Suspensions of different concentrations of particles were assayed to assess whether the sensitivity of the device according to FIG. 1 is comparable to conventional bulk solution impedance devices. Different concentrations of viable *B. subtilis* spores (Raven Biological Laboratories, Omaha, Nebr.) suspended in the buffer solutions in concentrations of $10^3$/ml, $10^5$/ml, $5\times10^6$/ml and $5\times10^7$/ml were examined using 20-ml glass vials and cylindrical (0.029 in. dia.) stainless steel electrodes, which were spaced 0.5 inches apart, center-to-center, and extended 1.65 inches below the top of the vials such that they were submerged in the test samples.

All applied voltages were a single-frequency AC signal. A SR830 Lock-In Amplifier (Stanford Research Systems, Sunnyvale, Calif.) was used as the voltage source and ammeter.

The terminals of the voltage source were rigidly connected to the stainless steel electrodes submerged in the sample via alligator clips. The circuit was assembled in series with the lock-in amplifier. The samples were tested sequentially in order of increasing analyte (spore) concentration. The vials were then cleaned using a 10% sodium hypochlorite solution and rinsed using deionized water between measurements. The impedance of each suspension tested was recorded five times for a total of 20 measurements.

Figure 10:
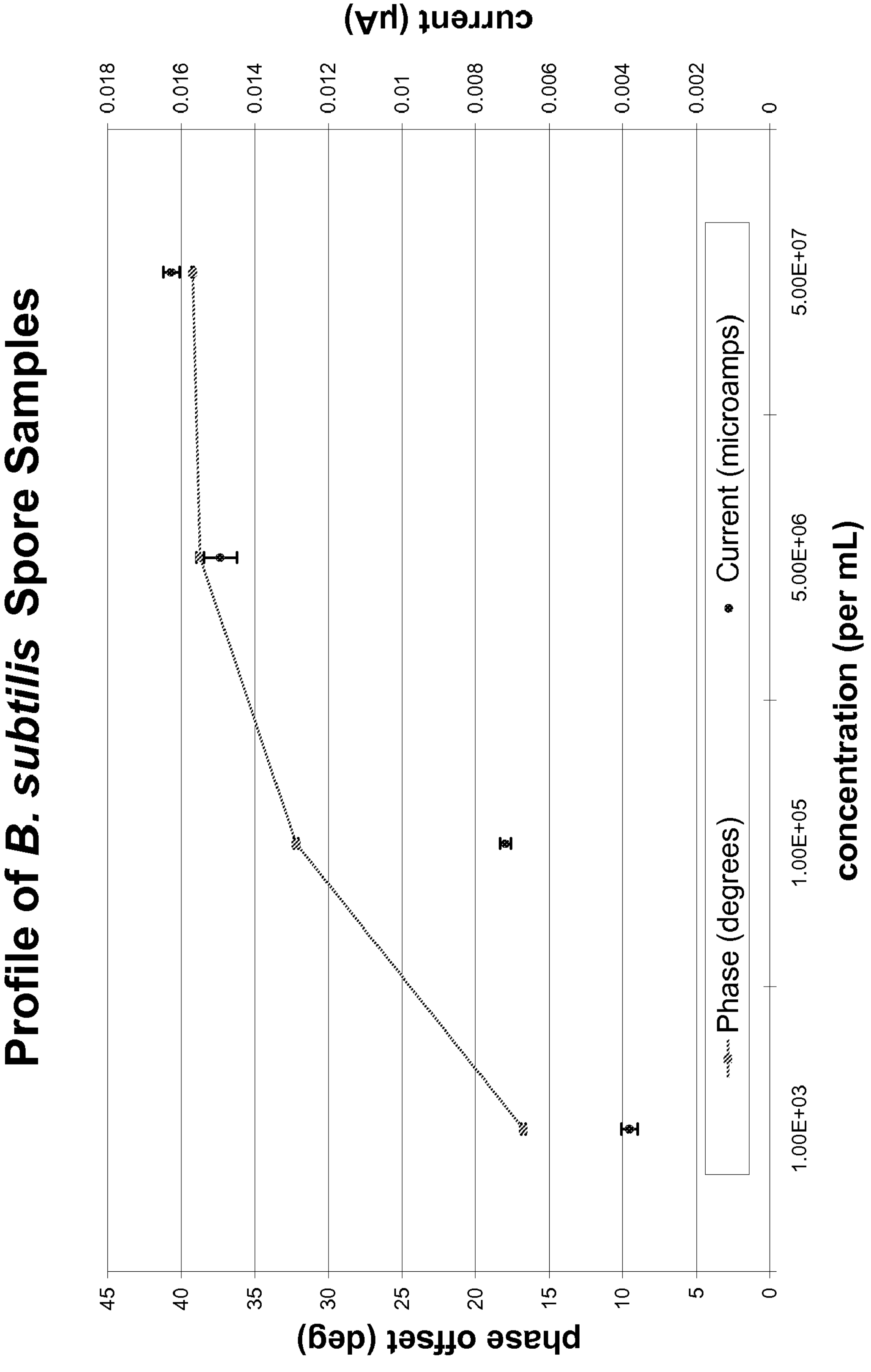
FIG. 10 shows the effect of analyte concentration on impedance characteristics. The analytes were viable *B. subtilis* spores. The applied voltage was a 20-mV amplitude (rms) sine wave oscillating at 1 kHz. These results were obtained from calibration experiments in bulk solution.
Figure 11:
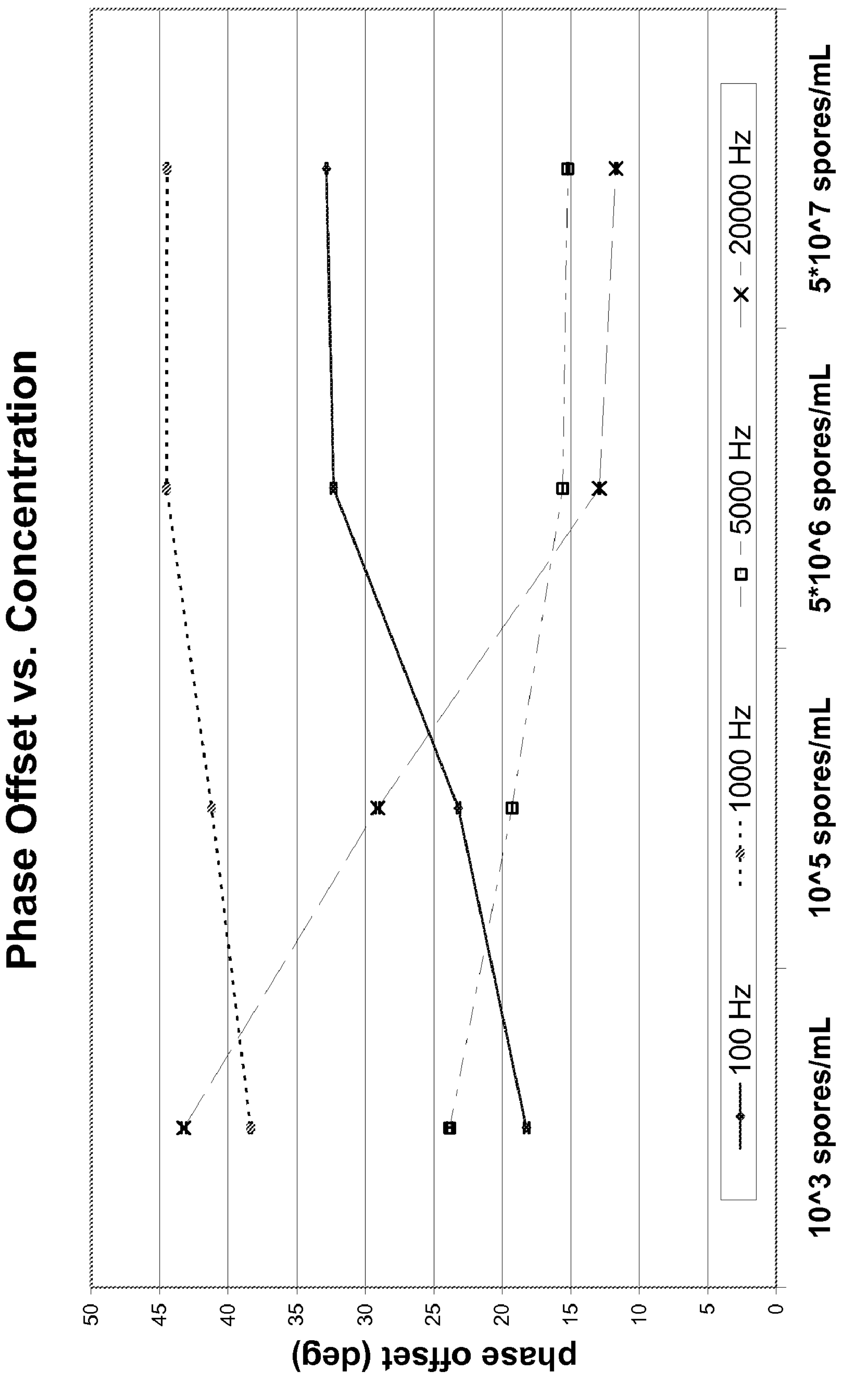
FIG. 11 is a graph showing the frequency dependence on impedance changes for different concentrations of *B. subtilis* spores. All voltages are 50-mV amplitude (rms) sine waves oscillating at different frequencies (0.1, 1, 5, 20 kHz). These results were obtained from calibration experiments in bulk solution.

FIG. 10 shows the correlations for both phase offset and current magnitude at different spore concentrations using the test sample vials. The applied voltage was a 20-mV amplitude (rms) sine wave oscillating at 1 kHz. FIG. 11 demonstrates the dependence of the change in impedance on electrical frequency (0.1, 1, 5, 20 kHz). Each concentration was tested at each frequency. The applied voltage was a 50-mV amplitude (rms) sine wave oscillating at the various electrical frequencies (0.1, 1, 5, 20 kHz). There was a visible contrast in the impedances for different concentrations, regardless of electrical frequencies. Thus, the concentrations may be determined by measuring impedance. At some frequencies the change in phase offsets were more pronounced and therefore more sensitive to changes in particle concentration. Therefore, the devices and methods described herein may be used to identify or characterize particles using impedance spectroscopy. See Carstensen et al. (1979) J. Bacteriol. 140(3):917-928, which is herein incorporated by reference.

Advantages of iDEPIM and Various Embodiments

The present invention, iDEPIM, is better than prior art DEPIM methods and devices as DEPIM is problematic because DEP uses electrode arrays in direct contact with sample solutions within the trapping area. The direct interface between an electrode and a solution results in electrode decay, fouling and electrolysis that can significantly impair device performance and lifetime. In addition, since DEP systems typically use an electrode array on one surface, there is rapid dissipation of the electric field within the channel which limits the channel height and flow rates of those systems to impractical levels. Also, DEP strictly requires AC electric fields as DC electric fields cause rapid failure of the devices.

The present invention, iDEP with IM uses insulating structures which do not result in direct electrode contact with the fluid in the microchannel area where particles are concentrated. Thus, the devices and methods herein exhibit negligible electrolysis and high repeatability without decay effects. Since there are no electrodes in direct contact with fluids in the microchannel area where particles are concentrated, the present invention may use AC electric fields, DC electric fields, or both to drive the dielectrophoresis.

As provided herein, not only does the present invention provide iDEP with IM, but in some embodiments, impedance detection occurs in an area of a microchannel that is different from the iDEP concentration area. Prior art DEPIM systems collocate the detection and the trapping. In the embodiments of the present invention where the particles are concentrated in one area of a microchannel and then detected in another microchannel area or a secondary microchannel, the devices and methods are more accurate, precise and sensitive as only the particles of interest which are concentrated are detected and measured since contaminants and debris are removed or reduced. In essence, iDEP acts as a selective non-clogging filter for picking out specific particles. As a filter, it can be turned on or off quickly and at will without clogging or degradation in performance with a high-throughput unattainable with conventional DEP devices and methods. Further, in these embodiments, since iDEP concentration occurs in an area different from the detection area, the sensing electrodes in the detection area need not be exposed to unwanted and potentially damaging substances in the sample being processed. In some embodiments, the sensing electrodes are passivated, which thereby prevents problems associated with direct liquid/metal contact.

The present invention allows an additional degree of operational freedom over prior art DEP systems (which employ a single AC electric field to trap and measure impedance) since the electric field used to concentrate analytes may be different from the electric field used to detect the concentrated particles. For example, it is possible to optimize particle concentration while also, independently, optimizing impedance detection (e.g. trap particles at a low frequency and detect the particles at a high frequency).

In embodiments where the detection area is different from the area where particles are concentrated, different types of particles may be consecutively and serially processed, i.e. particle A is first concentrated then moved to the detection area and detected while particle B is being concentrated and then particle A is moved from the detection area, particle B is moved to the detection area and detected while particle C is being concentrated, etc. Thus, in these embodiments one analyte specie is not inadvertently trapped at the same time another analyte specie is detected.

In some embodiments, two or more sets of insulating structures may be used to concentrate and separate at least two different analyte species in one or more samples. The sets of insulating structures may be the same or different. The concentrated and separated analytes may then be diverted or moved to different microchannels or different areas of a microchannel for detection or further processing.

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

We claim:

1. A microfluidic device for assaying at least one analyte specie in a sample comprising a first microchannel intersected by a second microchannel whereby the second microchannel divides the first microchannel into a first part and a second part and the first microchannel divides the second microchannel into a first part and a second part;

at least one analyte concentration area in the first part of the first microchannel having insulating structures on or in at least one wall of the first part of the first microchannel which provide a nonuniform electric field in the presence of an electric field provided by off-chip electrodes;

a pair of passivated sensing electrodes for impedance detection in a detection area in the first part of the second microchannel;

a pair of reference electrodes in a control area in the second part of the second microchannel.

2. The microfluidic device of claim 1, wherein the pair of passivated sensing electrodes provides a voltage source for the impedance detection.

3. The microfluidic device of claim 1, and further comprising a pair of impedance voltage source electrodes.

4. The microfluidic device of claim 1, wherein the impedance detection is electrical impedance tomography (EIT) or impedance spectroscopy.

5. The microfluidic device of claim 1, wherein the voltage source for the impedance detection is provided by one or more of the off-chip electrodes.

6. The microfluidic device of claim 1, wherein the second part of the first microchannel comprises a second analyte concentration area or a port leading to waste.

7. The microfluidic device of claim 1, wherein the insulating structures are in a patterned array.

8. The microfluidic device of claim 1, wherein at least two insulating structures are on or in opposing walls of the microchannel.

9. The microfluidic device of claim 1, and further comprising two or more microfluidic inlet ports.

10. The microfluidic device of claim 9, wherein at least one of the microfluidic inlet ports lacks off-chip electrodes.

11. The microfluidic device of claim 1, wherein the microfluidic channel is fabricated from a polymer substrate.

12. A method of assaying at least one analyte specie in a sample which comprises using the device according to claim 1 to flow the sample from the first part of the first microchannel to the second part of the first microchannel;

concentrating the analyte specie using insulator-based dielectrophoresis (iDEP) in the analyte concentration area;

moving the analyte specie to the first part of the second microchannel; and measuring the impedance of the concentrated analyte specie in the detection area with the pair of passivated sensing electrodes.

13. The method of claim 12, wherein two or more analytes of different species are simultaneously or sequentially concentrated, their impedances are measured simultaneously or sequentially, or a combination thereof.

14. The method of claim 13, wherein the analytes are concentrated in the same or different concentration areas.

15. The method of claim 13, wherein the impedances are measured in the same or different direction areas.

* * * * *